United States Patent
Anderson et al.

(10) Patent No.: US 12,180,567 B2
(45) Date of Patent: Dec. 31, 2024

(54) ULTRA-HIGH STRENGTH MULTPHASE HIGH-ENTROPY ALLOYS

(71) Applicants: Iowa State University Research Foundation, Inc., Ames, IA (US); National Technology & Engineering Solutions of Sandia, LLC, Albuquerque, NM (US)

(72) Inventors: Iver E. Anderson, Ames, IA (US); Emma Marie Hamilton White, Des Moines, IA (US); Duane Johnson, Ames, IA (US); Nicolas Argibay, Ames, IA (US); Andrew B. Kustas, Elizabeth, CO (US); Michael Chandross, Albuquerque, NM (US); Raymond V. Puckett, Albuquerque, NM (US)

(73) Assignees: Iowa State University Research Foundation, Inc., Ames, IA (US); National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/803,779

(22) Filed: Nov. 21, 2022

(65) Prior Publication Data
US 2023/0160043 A1    May 25, 2023

Related U.S. Application Data

(60) Provisional application No. 63/361,073, filed on Nov. 22, 2021.

(51) Int. Cl.
*B33Y 70/00*  (2020.01)
*B22F 9/08*  (2006.01)
(Continued)

(52) U.S. Cl.
CPC .............. *C22C 30/00* (2013.01); *B33Y 70/00* (2014.12); *C22C 14/00* (2013.01); *B22F 1/05* (2022.01);
(Continued)

(58) Field of Classification Search
CPC ................................ C22C 27/02; C22C 30/00
See application file for complete search history.

(56) References Cited

U.S. PATENT DOCUMENTS

| 2016/0326616 A1 | 11/2016 | Park | 75/245 |
|---|---|---|---|
| 2017/0209963 A1 | 7/2017 | Smathers | 219/76.12 |

(Continued)

FOREIGN PATENT DOCUMENTS

| CN | 104480444 A | * | 4/2015 |
|---|---|---|---|
| CN | 105734312 A | * | 7/2016 |

(Continued)

OTHER PUBLICATIONS

Senkov, O. N., et al. "Compositional variation effects on the microstructure and properties of a refractory high-entropy superalloy AlMo0. 5NbTa0. 5TiZr." Materials & Design 139 (2018): 498-511 (Year: 2018).*

(Continued)

*Primary Examiner* — Sally A Merkling
*Assistant Examiner* — Sean P. O'Keefe

(57) ABSTRACT

Refractory-reinforced multiphase high entropy alloys (RHEAs) advantageously providing high strength and fracture toughness in an as-AM deposited condition and other conditions are described.

20 Claims, 10 Drawing Sheets

(51) Int. Cl.
  *B33Y 10/00* (2015.01)
  *C22C 14/00* (2006.01)
  *C22C 30/00* (2006.01)
  *B22F 1/05* (2022.01)
  *B22F 3/105* (2006.01)
  *B22F 9/04* (2006.01)
  *B22F 10/28* (2021.01)

(52) U.S. Cl.
  CPC .............. *B22F 3/105* (2013.01); *B22F 9/04* (2013.01); *B22F 9/082* (2013.01); *B22F 10/28* (2021.01); *B22F 2202/13* (2013.01); *B22F 2301/052* (2013.01); *B22F 2304/10* (2013.01); *B22F 2998/10* (2013.01); *B33Y 10/00* (2014.12)

(56) References Cited

U.S. PATENT DOCUMENTS

| | | | |
|---|---|---|---|
| 2017/0218480 A1 | 8/2017 | Park | 428/613 |
| 2021/0301375 A1 | 9/2021 | Park | 420/552 |

FOREIGN PATENT DOCUMENTS

| | | |
|---|---|---|
| KR | 10-1684856 | 12/2016 |
| WO | 2017-209419 | 12/2017 |

OTHER PUBLICATIONS

Soni, V., et al. "Phase stability and microstructure evolution in a ductile refractory high entropy alloy Al10Nb15Ta5Ti30Zr40." Materialia 9 (2020): 100569. (Year: 2020).*
Cordero Z.C., et al, Six decades of the Hall-Petch effect—a survey of grain-size strenghtening studies on pure metals, Int. Mater. Rev., 61, 495-512, 2016.
Lu K., et al, Strengthening materials by engineered coherent internal boundaries at the nanoscale, Science (80-.) 324, 349-352, 2009.
Senkov O.N., et al, Effect of aluminum on the microstructure and properties of two refractory high-entropy alloys, Acta. Mater. 68, 24-228, 2014.
Dilip J.J., et al, A novel method to fabricate TiAl intermetallic alloy 3D parts using additive manufacturing, Def. Technol. 13, 72-76, 20187.
Chen, Wei et al, Additive manufacturing of titanium aluminides, Additive Manufacturing for the Aerospace Industry, pp. 235-263 2019.
Nartu, Muhan S. K.Y., Enhanced tensile yield strength in laser additively manufactured Al10. 3CoCrFeNi high entropy alloy, Materiala 9, p. 100522, 2020.
Tran, Anh et al, Multi-fidelity machine-learning with uncertainty quantification and Bayesian optimization for materials design: Application to ternary random allos, J. Chem. Phys. 153, p. 074705, 2020.
Miracle D.B., et al, A critical review of high entropy alloys and related concepts, Acta. Mater., 122, 448-511, 2017.
Heiden M.J., et al, Evolution of 316L stainless steel feedstock due to laser powder bed fusion process, Addit. Manuf., 25, 84-103, 2019.
Akono A.T., et al, Experimental determination of the fracture toughness via microscratch tests: Application to polymers, ceramics, and metals, J. Mater. Res., 27, 485-493, 2012.
Gludovatz B., et al, A fracture-resistant hgih-entropy alloy for cryogenic applications, Science, 80, 345, 1153-1158, 2014.
Zhu Z.G., et al, Selective laser melting enabling the hierarchically heterogeneous microstructure and excellent mechanical properties in an interstitial souble-strenghtened high entropy alloy, Mater. Res. Lett., 7, 453-459, 2019.
Guan S., et al, Additive Manufacturing of fine-grained and dislocation-populated CrMnFeCoNi hight entropy alloy by laser engineered net shaping, Mater. Sci. Eng. A761, 2018.

Li R., et al, Selective laser melting of an equiatomic CoCrFeMnNi high-entropy alloy: Proessability non-equilibrium microstructure and mechanical property, J. Alloys Compd., 746, 125-134, 2018.
Zhu Z.G., et al, Hierarchical microstructure and strengthening mechanisms of a CoCrFeNiMn high entropy alloy aditively manufactured by selective laser metlting, Scr. Mater., 154, 20-24, 2018.
Zhang M, et al, AlCoCuFeNi high-entropy alloy with tailored microstructure and outstanding compressive properties fabricated by selective laser melting with heat treatment, Mater. Sci. Eng., A743, 773-784, 2019.
Chew Y., et al, Microstructure and enhanced strength of laser aided additive manufactured CoCrFeNiMn high entropy alloy, Mater. Sci. Eng., A744, 137-144, 2019.
Li Q, et al, NbMoTa refractory high-entropy alloys fabricated byb laser cladding deposition, Materials (Basel) , 12, 1-14, 2019.
Peyrouzet F., et al, Selective Laser Melting of Al10 . 3CoCrFeNi High-Entropy Alloy: Printability, Mircostructure, and Mechanical Properties, JOM 701, 3443-3451, 2019.
Read N., et al, selective laser melting of AlSi10Mg alloy: Process optimization and mechanical properties development, Mater Des. 65, 417-424, 2015.
Uzan N.E., et al, Fatigue of AlSi10Mg alloy specimens fabricated by additive manufacturing selective laser melting (AM-SLM) , Mater. Sci. Eng., A704, 229-237, 2017.
Tong Z., et al, Laser additive manufacturing of FeCrCoMnNi high-entropy alloy: Effect of heat treatment on microstructure residual stress, and mechanical property, J. Alloys Compd, 785, 1144-1159, 2017.
Hitzler L., et al, Direction and location dependency of selective laser melted AlSi10Mg specimens, J. Mater. Process Technol., 243, 48-61, 2017.
Pegues J., et al, Effect of specimen surface area size on fatigue strength of additively nmanufactured Ti—6Al—4V parts, Sold Frre. Fabr., Proc. 28th Annu. Int. Solid Free. Fabr. Symp. An Addit. Manuf. Conf. SFF 2017, 122-133, 2020.
Carroll B.E., et al, Anisotropic tensile behavior of Ti—6Al—4V components fabricated with directed energy deposition additive manufacturing , Acta. Mater., 87, 309-32-, 2015.
Vrancken B., et al, Heat Treatment of Ti—6Al—4V produced by Selecitve Laser Melting: Microstructure and mechanical properties J. Alloys Compd., 541, 177-185, 2012.
Ben V., et al, Selective laser melting of biocompatible metals for rapid manufacturing of of medical parts, Rapid Protyp. J., 13, 196-203, 2017.
Kin Y. K., et al, Selective laser melted equiatomic CoCrFeMnNi high-entropy alloy: Microstructure, anisotropic mechanical response, and multiple strengthening mechanism, J. Alloys Compd, 805, 680-691, 2019.
Zhou R., et al, Microstructure and mechanical properties of C-containing FeCrFeNi high-entropy alloy fabricated by laser melting, Intermetallics, 94, 165-171, 2018.
Wu W., et al, Nanosize precipitates and dislocation networks reinforced C-containing CoCrFeNi high-entropy alloy fabricated by selective laser melting, Mater. Charact., 144, 605-610, 2018.
Brif Y., et al, The use of high-entropy alloys in additive manufacturing, Scr. Mater., 99, 93-96, 2015.
Joseph J., et al, Effect of hot isostatic pressing on the microstructure and mechanical propeties of additively manufactured AllxCoCrFeNi high entropy alloys, Mater. Sci. Eng. A733, 59-70, 2018.
Zhou P.F., et al, Al10.5FeCoCrNi high entropy alloy prepared by selective laser melting with gas-atomized pre-alloy powders, Mater. Sci. Eng. A739, 86-89, 2019.
Luo S, et al, Selective laser melting of dual phase AlCrCuFeNix hgih entropy alloys: Formability, heterogeneous microstructures and deformation mechanisms, Addit. Manuf. 31, 10095, 2020.
Oliver W.C., Measurement of hardness and elastic modulus by instrumented indentation: Advances in understanding and refinements in methodology, J. Mater. Res. 19, 3-20, 2004.
Nyakiti L.O., et al, Characterization of strain-rate sensitivity and grain boundary structure in nanocrystalline gold-copper alloys, Metall. Mater. Trans. A Phys. Metall. Mater, 41, 838-847, 2010.

(56) References Cited

OTHER PUBLICATIONS

Nix W. D., et al, Indentation size effects in crystalline materials: A law for strain gradient plasticity, J. Mech. Phys. Solids, 46, 411-425, 1998.

Gu C.D., et al, Experimental and modelling investigations on strain rate sensitivity of electrodeposited 20 nm grin sized Ni, J. Phys. D. Appl. Phys. 40, 7440-7446, 2007.

Wang F., et al, Multiplicity of dislocation pathways in a refractory multiprincipal element alloy, Science 370, 95-1-1, 2020.

Singh P., et al, First-principles prediction of incipient order in arbitrary high-entropy alloys: exemplified in Ti0.25CrFeNiAlx Acta. Mater. 189, 248-254, 2020.

Singh P., et al, Atomic short-range order and incipient long-range order in high-entropy alloys, Phys. Rev. B-Condens. Matter. Phys. 91, 1-12, 2015.

Singh P., et al, Design of high-strength refractory complex solid-solution alloys, npj Comput. Mater. 4, 2018.

Singh P., et al, Vacancy-mediated complex phase selection in hihg-entropy alloys, Acta. Mater. 194, 540-546, 2020.

Chen B., et al, Unusual activated processes controlliing dislocation motion in body-centered-cubic high-entropy alloys, Proc. Natl. Acad. Sci. U.S.A., 117, 16199-161206, 2020.

Peng T., et al, Sustainability of additive manufacturing; An overview on its energy demand and environmetal impact, Addit. Manuf., 21, 694-704, 2018.

Lewandowski et al, Metal Additive Manufacturing: A review of Mechanical Properties, Annu. Rev. Mater. Res., 46, 151-186, 2016.

Bajaj P. et al, Steels in additive manufacturing: A review of their microstructure and properties, Mater. Sci. Eng., A772, 2020.

George E.P. et al, High-entropy alloys, Nat. Rev. Mater., 4, 515-534, 2019.

Martin J.H., et al, 3D printing of high-strength aluminum alloys, Nature 549, 365-369, 2017.

Hu, X. et al., Towards an integrated experimental and computational framework for large-scale metal additive manufacturing, Mater. Sci. Eng., A761, 138057, 2019.

Melia M.A., et al, High-throughput additive manufacturing and characterization of refractory high entropy alloys, Appl. Mater. Today, 19, 100560, 2020.

Peques J.W., et al, Exploring additive manufacturing as a high-throughtput screening tool for multiphase high energy alloys, Addit. Manuf., 101598, 2020.

Kustas A.B., et al, Characterization of Fe—Co-1. 5V soft magnetic alloy processed by Laser Engineered Net Shaping (LENS), Addit. Manuf., 21, 41-52, 2018.

Senkov O.N., et al, Development and exploration of refractory hiigh entropy alloys—A review, J. Mater. Res., 33, 3092-3128, 2018.

\* cited by examiner

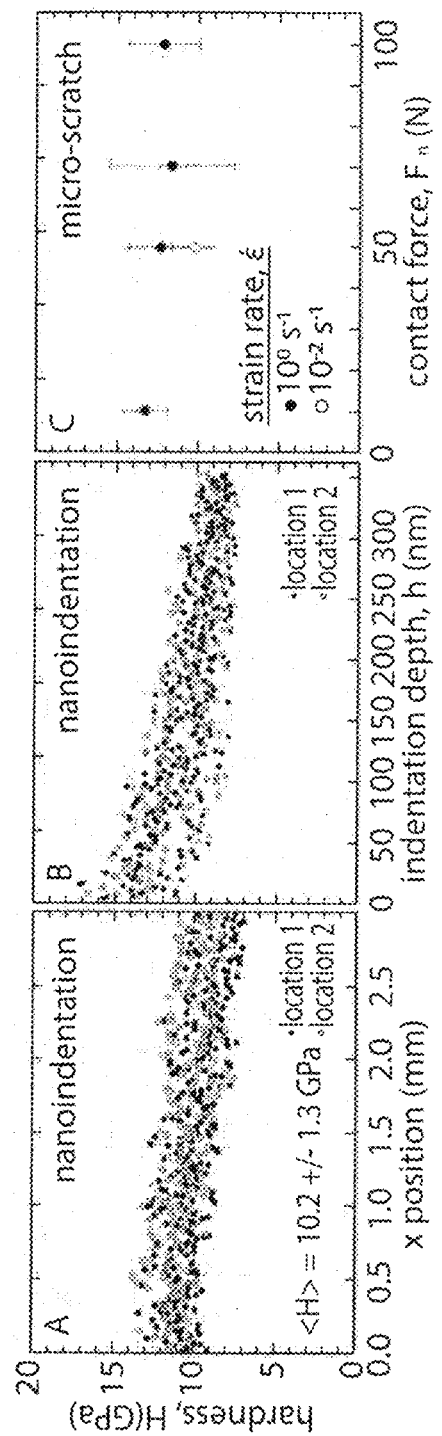

Table 1. Summary of composition (in at.%) and calculated formation energy of the nominal alloy and all 4 phases in as-built microstructure, along with sum of Al and Ti content (at.%).

Composition and A1 & A2 formation energy ($E_{form}$)

| | Al | Ti | Zr | Nb | Ta | Mo | A1 | A2 (meV/atom) | %Al+%Ti |
|---|---|---|---|---|---|---|---|---|---|
| *#0 | 42 | 25 | 08 | 13 | 04 | 08 | -102.7 | -179 | (Al+Ti)67 |
| | | | Zr | Y=17 | X | | BCC | | Z=67 |
| #1 | 51.0 | 29.0 | 0.0 | 10.0 | 5.0 | 5.0 | -143.5 | -207.8 | no Zr (AlTi)80 |
| #2 | 55.0 | 21.0 | 13.0 | 5.0 | 3.0 | 3.0 | -143.8 | -184.8 | (AlTi)76 |
| #3 | 64.0 | 25.0 | 3.0 | 6.0 | 2.0 | 0.0 | -164.8 | -197.3 | no Mo(AlTi)89 |
| #4 | 43.0 | 34.0 | 10.0 | 5.0 | 4.0 | 4.0 | -141.0 | -194.6 | (AlTi)77 |

Fig. 4

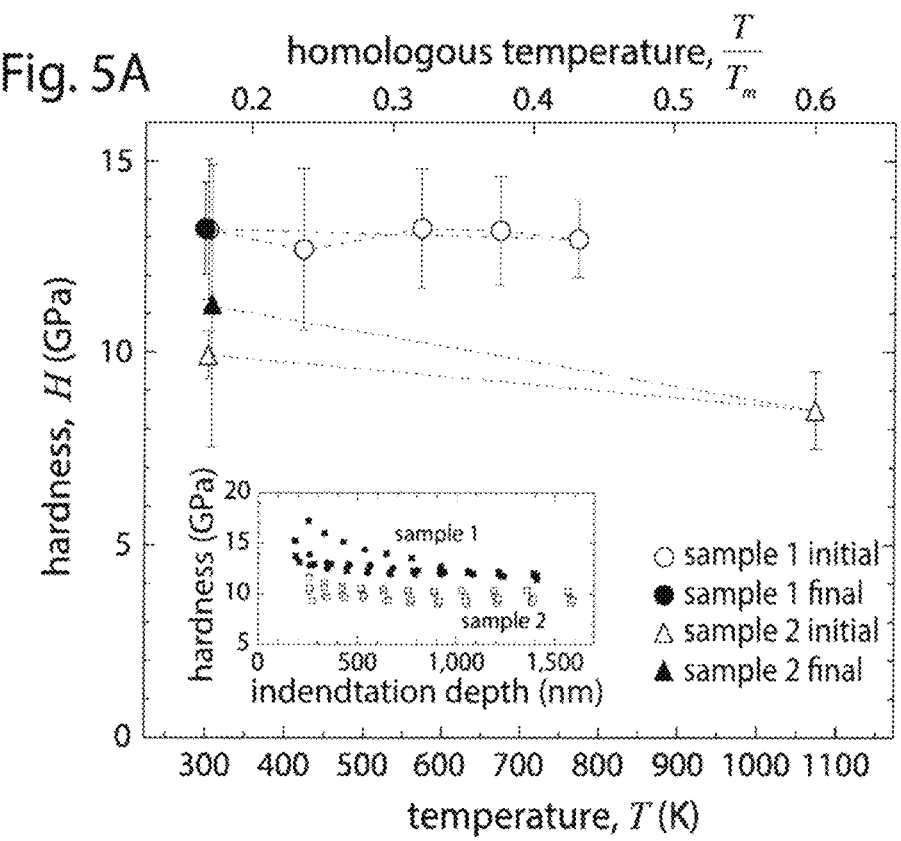
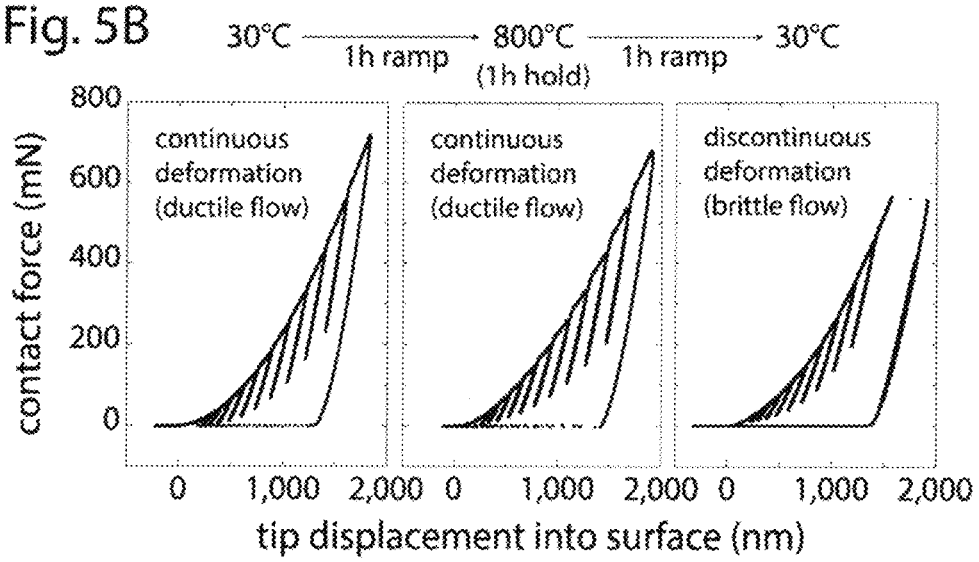

as built as built post 800°C heat treatment post 800°C heat treatment

ULTRA-HIGH STRENGTH MULTPHASE HIGH-ENTROPY ALLOYS

RELATED APPLICATION

This application claims benefit and priority of U.S. provisional application Ser. No. 63/361,073 filed Nov. 22, 2021, the entire disclosure and drawings of which are incorporated herein by reference.

CONTRACTUAL ORIGIN OF THE INVENTION

This invention was made with government support under Grant No. DE-AC-02-07CH11358 and Grant No. DE-NA0003525 awarded by the U.S. Department of Energy. The government has certain rights in the invention.

FIELD OF THE INVENTION

The present invention relates to refractory-reinforced multiphase high-entropy alloys specially designed for, although not limited to, additive manufacturing (AM) of AM deposited metallic structures having improved mechanical properties, such as increased strength and hardness.

BACKGROUND OF THE INVENTION

As the sophistication and quality of metal additive manufacturing (AM) continues to improve, research has shifted from feasibility studies towards process optimization[1]. Significant challenges remain to producing near net-shape parts with mechanical properties that can compete with traditional manufacturing techniques and alloys. Two new trends have recently emerged that present tantalizing opportunities to recast the value proposition for metal AM: (1) using metal AM for high-throughput materials discovery, particularly targeting high-entropy alloys (HEAs), and (2) a shift in emphasis from process optimization towards alloy design as a means of circumventing or addressing inherent limitations of AM techniques. Achieving desirable microstructures with traditional alloys via AM remains a challenge due to the inherently extreme thermal conditions; for example, a century of steel manufacturing optimization has led to processing sequences that are highly misaligned with the rapid melting and solidification typical of AM methods.

SUMMARY OF THE INVENTION

Embodiments of the present invention provide a refractory-reinforced multiphase high entropy alloy (RHEA) advantageously providing high strength and fracture toughness in an as-built AM deposited condition as well as in a sintered condition or a rapidly solidified (RS) condition, all of which would result in a highly refined grain size.

Certain embodiments of the present invention provide an Al/Ti-rich RHEA having Al and Ti as major alloy constituents and Nb, Zr, Mo, and Ta as minor alloy constituents whose minor collective content is effective to provide a beneficial polyphase microstructure including four (4) compositionally distinct phases in the as-built AM solidified deposited condition wherein the polyphase microstructure imparts high strength and hardness to the as-deposited alloy with nearly temperature-independent hardness/strength up to 800° C., exceeding the performance of current state-of-the-art Ni-based superalloys. A sintered structure or body having a similar beneficial polyphase microstructure having high strength and hardness is provided by sintering processing such as, including but not limited to pressure assisted or electrical current assisted sintering of gas atomized powder.

A certain embodiment of the present invention provides a RHEA represented by $Al_{0.42}Ti_{0.25}Nb_{0.13}Zr_{0.08}Mo_{0.08}Ta_{0.04}$ and variants of that composition that produce the beneficial polyphase microstructure.

Another certain embodiment of the present invention provides a RHEA having an Al content greater than about 20 atomic % to less than about 70 atomic %, an Al+Ti content greater than about 55 atomic % and less than about 75 atomic %, and a collective content of Nb, Zr, Mo, and Ta and of about 25 atomic % to about 45 atomic %.

Certain method embodiments of the present invention involve directed-energy deposition additive manufacturing (AM) using a heterogeneous (mechanically-milled at cryogenic temperatures from elemental powders) precursor powder that is laser beam melted and deposited to form the RHEA and to build an AM-printed metallic structure. Other certain embodiments involve plasma melting the RHEA constituents in a cold hearth tilt pour furnace to form a homogenous melt and then gas atomizing the melt in a manner to form generally spherical atomized alloy particles that then can be used for such AM processing.

The present invention advantageously can produce AM-printed metallic structures, sintered structures, and RS structures that comprise the RHEA having the above compositional and polyphase microstructural features to impart exceptionally high strength and hardness to the structure.

BRIEF DESCRIPTION OF THE DRAWINGS

FIGS. 1A and 1B show position and depth-dependent nanoindentation hardness of specimen, respectively; FIG. 1C shows contact force dependent micro-scratch hardness.

FIG. 4 contains Table 1.

FIG. 5A is a plot of nano-indentation hardness as a function of temperature for the exemplar alloy represented by $Al_{0.42}Ti_{0.25}Nb_{0.13}Zr_{0.08}Mo_{0.08}Ta_{0.04}$. FIG. 5B shows representative force-displacement curves showing a transition from ductile to brittle behavior after prolonged 800° C. exposure.

DETAILED DESCRIPTION OF THE INVENTION

Figure 1D:
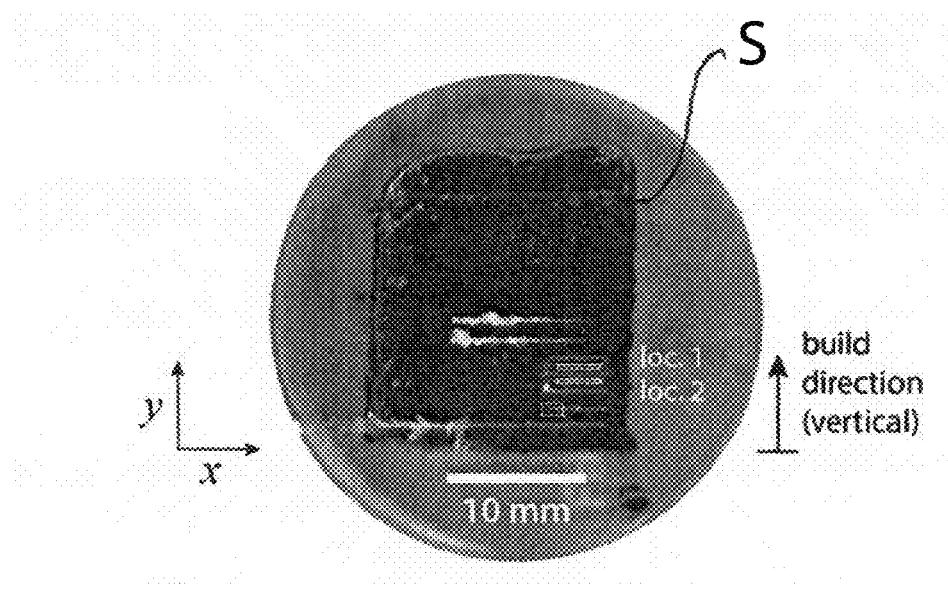
FIG. 1D is a plan-view image of the cross-sectioned polished and epoxy-mounted specimen used in the testing.
Figure 1G:
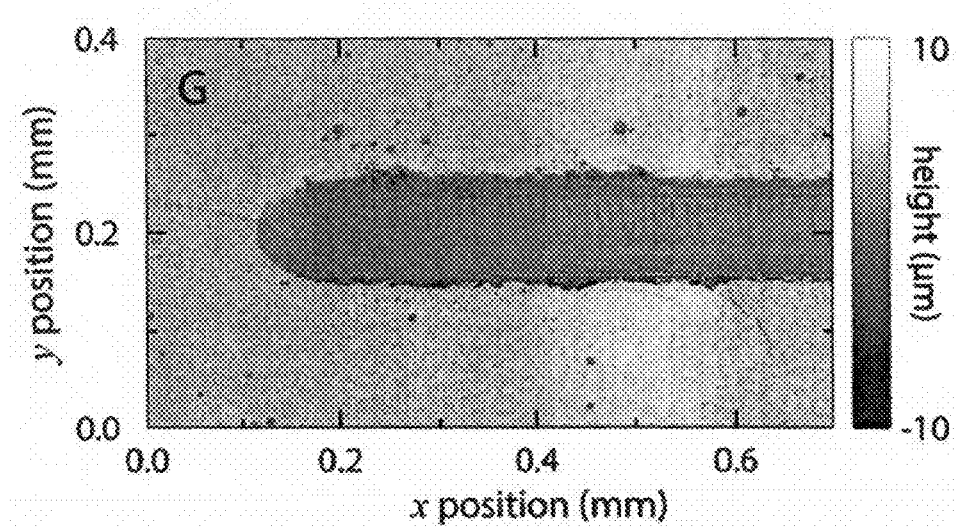
FIG. 1G is an exemplary topographical interferometric map of a micro-scratch wear track.
Figure 1E:
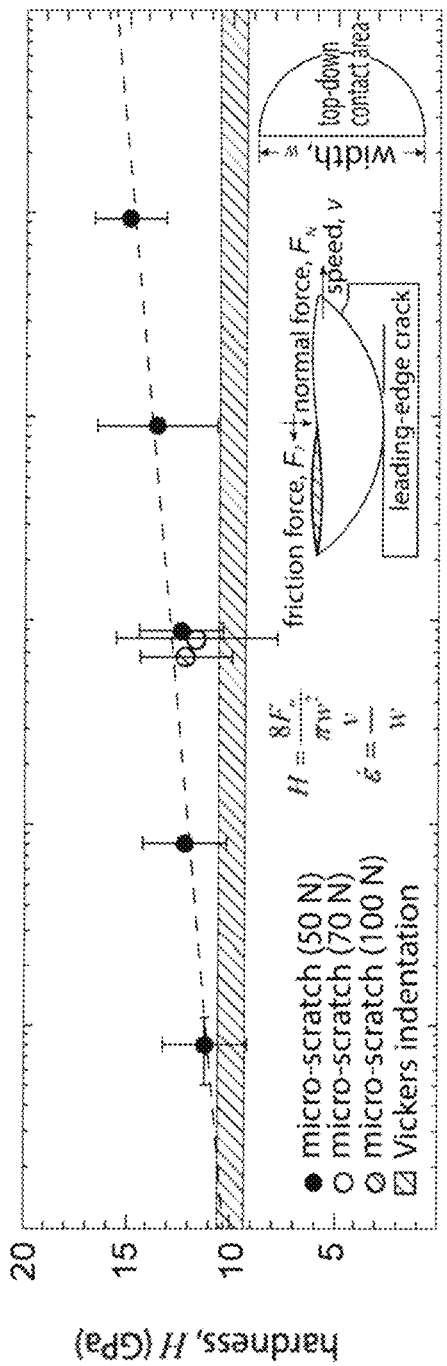
FIGS. 1E and 1F show strain-rate-dependent micro-scratch hardness and fracture toughness, respectively.
Figure 1F:
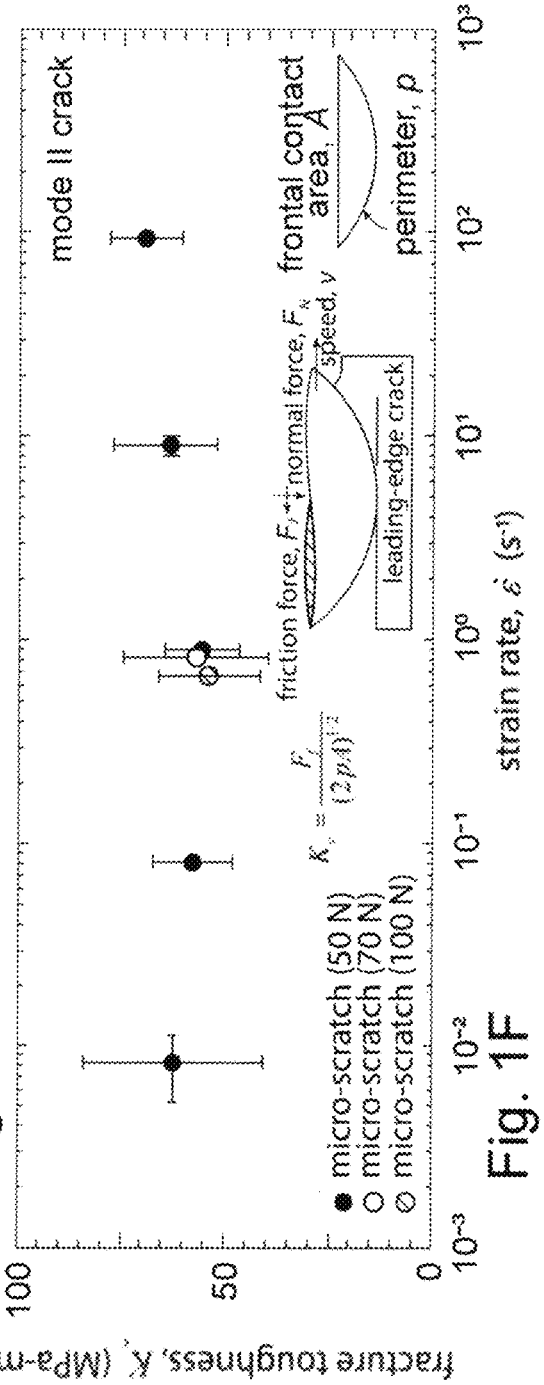

Certain embodiments of the present invention provide an AM-enabled refractory-reinforced multiphase high entropy alloys (RHEA's) whose composition and fine-grained (<~10 μm) microstructure is controlled to advantageously provide high strength and fracture toughness in an as-deposited (as-solidified) or as-sintered (to full density) condition. Embodiments of the present invention resulted from the discovery of a new RHEA having an average (exemplar) composition of $Al_{0.42}Ti_{0.25}Nb_{0.13}Zr_{0.08}Mo_{0.08}Ta_{0.04}$, which alloy was found to have extraordinary mechanical properties (FIGS. 1A-1C and 1E-1F), including high strength and fracture toughness (FIG. 2A) in the as-AM solidified deposited condition.

For purposes of illustration and not limitation, the RHEA (also designated herein as MPEA for multi-principal element alloy) exemplar alloy is Al- and Ti-rich, with a nominal exemplar composition $Al_{0.42}Ti_{0.25}Nb_{0.13}Zr_{0.08}Mo_{0.08}Ta_{0.04}$, and was found to have high hardness (H=10-15 GPa) and scratch-based (mode II) fracture toughness ($K_c$=40-85 MPa-m$^{1/2}$), along with low density ($\rho$=5.7 g/cm$^3$), notable room-temperature indentation-based ductility (>10%) and high-temperature resiliency (8 GPa hardness retained to 800° C.). The specific strength of the MPEA based alloy depends on the ratio of hardness and density is 1.8-2.6 GPa-cm$^3$/g, a value that surpasses all known alloys, including 1) intermetallic compounds and legacy titanium aluminides, 2) refractory MPEAs, and 3) conventional Ni-based superalloys. This specific strength is a 300% improvement over Inconel 718 based on measured peak hardness of 4.5 GPa and density of 8.2 g/cm$^3$, which gives a ratio of 0.55 GPa-cm$^3$/g. Notably, certain alloy embodiments of the present invention enable retention of high-strength at high-temperatures, exceeding the performance of conventional Ni-based alloys.

Embodiments of the present invention include a RHEA represented by $Al_{0.42}Ti_{0.25}Nb_{0.13}Zr_{0.08}Mo_{0.08}Ta_{0.04}$ and variants of that composition, wherein the content of one or more of the constituent alloying elements can be varied that produces the beneficial polyphase microstructure including four (4) compositionally distinct phases in the as-deposited (as-built) or sintered condition or RS condition where rapid cooling casting techniques such as melt spinning can be used to provide a crystalline equiaxed grain size having a micron scale grain dimension less than about 10 μm. Thus, Al+Ti are major alloy constituents being more than 50 atomic % of the alloy composition.

Other embodiments of the present invention were discovered to include Al/Ti-rich RHEA's having a composition comprising an Al content greater than about 20 atomic % to less than about 70 atomic %, an Al+Ti content greater than about 55 atomic % and less than about 75 atomic %, and a collective content of Nb, Zr, Mo, and Ta is about 25 atomic % to about 45 atomic % and having high strength and fracture toughness.

The present invention will be described here-below in Examples with respect to certain illustrative alloy embodiment that achieves high strength and fracture toughness; however, the present invention is not limited to these illustrative embodiments that are offered for purposes of illustration and not limitation.

EXAMPLES

AM Synthesis

Cryo-ball milling of the alloy constituents (as Al, Ti, Nb, Zr, Mo, Ta elemental powders) was used to generate a pre-mixed but compositionally segregated precursor powder that enabled large heats of mixing and in-situ exothermic reactions to assist with powder melting during AM processing. Cryo-milling was conducted in a modified Union Process-brand attritor mill under liquid nitrogen atmosphere for 8 hours.

Alternately, as-gas atomized alloy powder having the desired alloy composition (i.e. a pre-alloyed composition) can be used as the feedstock for the AM process.

The laser-beam directed-energy deposition (LB-DED) AM technique (described in reference 9 which is incorporated herein by reference) required a surprisingly low laser beam power (100-110W) to sufficiently melt the heterogeneous alloy precursor powder. Single track thin wall specimens of the new RHEA were fabricated (deposited and solidified) on titanium substrates using an open-architecture LB-DED system equipped with a YLS-2000 laser operating at a wavelength of 1064 nm. The laser was mounted to the spindle of a 3-axis Tormach CNC 770 and housed inside an inert atmosphere was maintained at <500 ppm O2 and <0.5 ppm H$_2$O.

The Table below lists the process conditions for the thin wall consolidation. Excessive heating during fabrication was minimized by adding a two second delay between each layer

| Laser Power (W) | Table Speed (mm/min) | Optic Size (mm) | Layer Height (mm) | Substrate Temp. (° C.) |
|---|---|---|---|---|
| 100 | 300 | 2.3 | 0.2 | 200 |

Mechanical Property and Microstructural Evaluation Experimental Methods

1. AlMoNbTaTiZr RHEA Scratch Test Methods

A flat RHEA specimen was produced with an average surface roughness $R_a$ of about 25 nm. The sample was subject to grinding using SiC paper and fine polishing with steps of 9, 6, 3, and 1 μm MOL polishing cloths.

1.1 Determination of Strain Rate Dependent Hardness

Microscratch experiments (references 1,2 and 4,5) were performed using a Revetest Scratch Tester (RST[3]). To determine strain-rate dependent hardness, scratches were made by dragging a sphero-conical indenter (radius R=200 μm+/−10 μm and apex angle α=120°+/−10) over a 3 mm track length with a 50 N normal force and a constant velocity. Five wear tracks were produced with five decades of scratch speed (proportional to strain rate) ranging $10^{-3}$ to $10^1$ mm/s. Each track was spaced 0.5 mm apart to avoid work hardening effects from previous tracks. To assess load dependent hardness, scratches were performed under 10, 50, 70, and 100 N normal forces at a constant velocity of $10^{-1}$ mm/s. A mildly abrasive cloth was used to clean the indenter tip between scratches to avoid transferring material between wear tracks. The spheroconical diamond indenter can be used for multiple repeated scratches due to its exceptional hardness and wear resistance.

A Bruker Contour GT-I optical interferometer with a 10× objective and 0.55× magnification was used to topographically scan each 3 mm wear track. To avoid sections of the scratch track that may have experienced acceleration/deceleration effects, the beginning and end 0.5 mm of wear track was omitted from analysis. The average and standard deviation in the wear track width was used to calculate the hardness and strain rate at a given scratch speed. The strain rate ($\dot{\varepsilon}$) is a ratio of scratch velocity (v) to scratch width (w), $$\dot{\varepsilon} = \frac{v}{w}.$$

The expression for hardness (H) is a function of a geometric constant $8/\pi$ term, the normal force ($F_n$), and the scratch width (w), $$H = \left(\frac{8}{\pi}\right)\frac{F_n}{w^2}.$$

A detailed overview of this method can be found elsewhere (see reference 4).

Activation volume (V) and strain rate sensitivity (m) were determined from strain-rate dependent micro-scratch hardness measurements, using the following expressions, $$V = 3\sqrt{3}kT\left(\frac{\partial \ln\dot{\varepsilon}}{\partial H}\right) \text{ and } m = \frac{\partial \ln(H)}{\partial \ln(\dot{\varepsilon})}$$

1.2 Determination of Fracture Toughness

Data from the microscratch experiments were also used to determine fracture toughness. Using the topographical scan from a scratch track, the average and standard deviation values for maximum penetration depth were found and analyzed.

Following classic linear elastic fracture mechanics, the sphero-conical probe tip is known to generate a semicircular horizontal crack planer (see references 3, 6-9). Fracture toughness $K_c$ is then expressed as a function of the measured lateral force F, the perimeter length p, and the projected contact area, A.

$$K_c = \frac{F_t}{\sqrt{2pA}}$$

The perimeter length p is calculated using the arclength formula for the spheroconical probe, where R is the 200 μm indenter radius, and $d_p$ is the maximum penetration depth of the scratch.

$$p = 2R\arccos\left[\frac{R-d_p}{R}\right]$$

The projected contact area is a function of the tip radius R, the maximum penetration depth $d_p$, and perimeter length p.

$$A = \frac{1}{2}Rp - (R-d_p)\sqrt{R^2-(R-d_p)^2}$$

2. AlMoNbTaTiZr RHEA Nanoindentation Methods

Nanoindentation hardness measurements were performed on a Hysitron Performech Triboindenter with a Berkovich tip using the Oliver-Pharr method (see reference 10 incorporated herein by reference). The flat RHEA AM specimen used for the microscratch experiments was subsequently used for the nanoindentation experiments; the indents were placed near the residual scratches both to facilitate direct comparisons between results and to locate residual indents after testing. Prior to the RHEA measurements, the tip area function and load frame compliance were calibrated over the entire load range of the instrument using fused silica as the reference material. For the Berkovich tip, the tip area function $A(h_c)$ was defined as, $A(h_c)=C_0h_c^2+C_1h_c$, where $h_c$ is the contact depth and $C_0$ and $C_1$ are coefficients related to tip shape as described by W. C. Oliver et al. in J. Mater. Res. 7, 1564, 1992.

4. Microstructural Characterization by Scanning Transmission Electron Microscopy Microstructures of RHEA specimen were studied by scanning transmission electron microscopy (STEM). The TEM samples were prepared by focused ion beam (FIB) method. An FEI Titan™ G2 80-200 STEM with a Cs probe corrector and ChemiSTEM™ technology (X-FEG™ and SuperX™ EDS with four windowless silicon drift detectors) operated at 200 kV was used in this study. A high-angle annular dark-field (HAADF) detector was used for recording STEM images. The STEM energy-dispersive x-ray spectroscopy (EDS) was used for the compositional phase analysis. The EDS spectral imaging was acquired as a series of frames where the same region was scanned multiple times. A typical acquisition of EDS spectral imaging took more than 1 hr. An electron probe of size less than ~0.13 nm, convergence angle of 18.1 mrad, and current of ~75 pA was used for data acquisition. HAADF images were recorded under similar optical conditions using an annular detector with a collection range of 60-160 mrad. Al K, Ti K, Zr L, Nb L, Mo L and Ta M lines were used for constructing the EDS maps of Al, Ti, Zr, Nb, Mo and Ta, respectively. Since the Al K, Zr L, Nb L, Mo L and Ta M lines overlap significantly, the EDS spectra were deconvoluted pixel-by-pixel using pure spectra of Al, Zr, Nb, Mo and Ta as references. The atomic concentration of the phase was calculated using the Cliff and Lorimer method[12]. The error of phase composition was estimated to be within 5%, largely due to uncertainty of the K factor used in the Lorimer method.

Figure 2A:
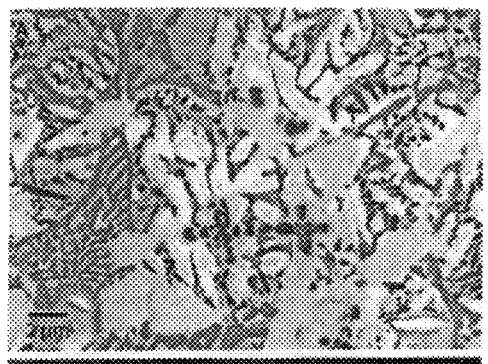
FIG. 2A is an SEM image of the as-deposited microstructure with 2 μm scale bar.

Results:

Thin-wall coupon specimens approximately 20×25×5 $mm^3$ were each printed, sectioned, potted in epoxy, and polished to a 40 nm $SiO_2$ slurry via vibratory polishing, (FIG. 1D). The 3D printing was achieved using the open architecture LB-DED printer described above. The mechanical properties were studied with nanoindentation, microscratch, and Vickers indentation methods as described above in detail.

The discovered RHEA having an average composition of $Al_{0.42}Ti_{0.25}Nb_{0.13}Zr_{0.08}Mo_{0.08}Ta_{0.04}$, was found to have extraordinary mechanical properties (FIGS. 1A-1C and 1E-1F), including high strength and fracture toughness in the as-AM deposited (as-built) condition. The combination of material strength and energy-efficient processing represents a paradigm shift when compared to AM processing of other high entropy alloys (HEAs) and similarly low-density Al and Ti alloys.

This illustrative embodiment is an example of how careful feedstock design can enable energy-efficient AM processing of alloys, particularly those with compositions that would be impractical to create conventionally. The results also demonstrate that, despite low quality (from the standpoint of additive processability and flowability) cryo-ball-milled feedstock powder, the process in combination with unconventional suite of characterization tools, e.g., micro-scratch measurements of strain rate dependent strength and toughness, was extremely effective for materials development.

Figure 2B:
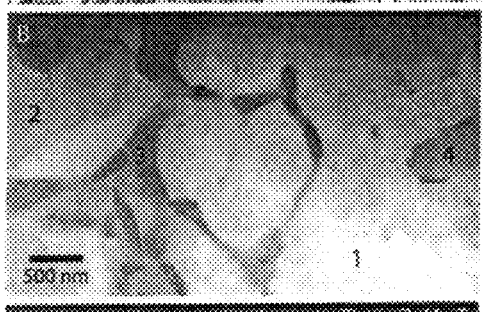
FIG. 2B is an STEM high-angle annular dark field image showing near-surface deformation along the centerline of a 10 N micro-scratch track.
Figure 2C:
FIG. 2C shows overlaid composition maps showing four compositionally distinct phases; for phases A1-A4, these are: (1) $Al_{0.36}Ti_{0.26}Nb_{0.19}Zr_{0.02}Mo_{0.12}Ta_{0.05}$, (2) $Al_{0.42}Ti_{0.19}Nb_{0.12}Zr_{0.17}Mo_{0.07}Ta_{0.03}$, (3) $Al_{0.49}Ti_{0.27}Nb_{0.13}Zr_{0.08}Mo_{0.04}Ta_{0.02}$, and (4) $Al_{0.35}Ti_{0.36}Nb_{0.10}Zr_{0.02}Mo_{0.13}Ta_{0.04}$.
Figure 2D:
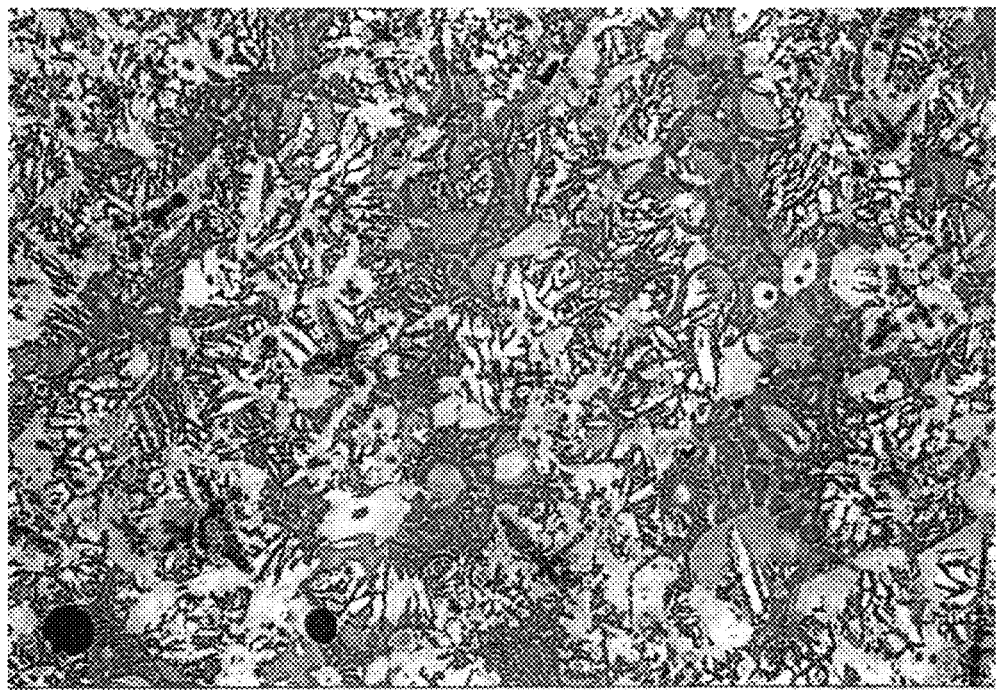
FIG. 2D shows an image of the as-deposited microstructure with a 10 μm scale bar.

Results from the different strength measurement techniques were in agreement and show that this alloy exhibits a combination of high strength and fracture toughness that is promoted by a refined nanoscale multiphase microstructure (as shown via scanning transmission electron microscopy (STEM) in FIGS. 3A-3C and FIG. 4—Table 1). Using the Tabor factor, the conversion of hardness to uniaxial tensile strength, i.e., $\sigma_y$=H/3 can be achieved. Microscatch tests of strain-rate dependent hardness data was used to determine strain-rate sensitivity (m=0.030) and activation volume (V=55 Å$^3$) (details of test method set forth above). Two linear arrays of 300 nanoindentation measurements were made parallel to the micro-scratch tracks on a sectioned and polished coupon (FIG. 1D). The hardness and fracture toughness values are in good agreement with those for nanocrystalline (grain sizes <100 nm) pure metals and alloys, and indicate that plasticity is primarily dislocation mediated, although Applicants do not intend to be bound in this regard. However, these values are typically associated with the prevalence of partial dislocation emission from grain boundaries and small edge dislocation line lengths, corresponding to highly-localized, steep strain fields. This result is unusual, considering that the present material is neither face-centered cubic (FCC) nor particularly fine-grained (the grain size of the tested RHEA specimens varied for each phase, from about 500 nm to, generally, less than 10 microns (FIGS. 2A-2C)).

This mechanical property data revealed several interesting features: gradual trends of (1) increasing strength moving from the coupon specimen wall towards the core of the specimen, normal to the 3D printed build direction, (2) slightly decreasing strength along the build direction away from the coupon specimen-baseplate interface, and (3) significant variability in strength (high standard deviation) with small changes in location. These trends suggest that the gradient in strength is correlated with build height, though this is likely the result of multiple factors that cannot easily be deconvoluted. More significantly, given the grain size (FIG. 2A), determined by scanning electron microscopy (SEM), and the composition variability (from STEM) of the four distinct phases A1-A4 (FIG. 2A-2C), it is likely that the variability in nanoindentation hardness at constant depth of 250 nm (FIG. 1A) shows the strength differences between the four phases. Conversely, variability in micro-scratch hardness, which is averaged over larger volumes with a coarser (roughly 500 nm) lateral resolution, is more indicative of an aggregate response, and dominated by the weakest phase and the presence of defects on similar length scales.

For $Al_{0.42}Ti_{0.25}Nb_{0.13}Zr_{0.08}Mo_{0.08}Ta_{0.04}$ (nominal atomic %), the A2 crystal structure (body-centered cubic) was found to be the most stable, with a formation energy, $E_{form}$, of −17.35 kJ/mol (−7.44 kJ/mol lower than A1, or face-centered cubic, structure). The homogeneously A2 parent alloy has an average lattice constant of a=3.213 Å and bulk modulus of B=128 GPa. Compared to the alloy compositions in regions 1-4, both the homogeneous A1 and A2 structures were found to have $E_{form}$ lower by 1.2-2.6 kJ/mol, implying that the compositions found in each region are energetically unfavorable (non-equilibrium). Finally, using a fast estimate (composition-weighted elemental melt temperatures) for the homogenous A2 alloy, the melting temperature was estimated to be ~1787 K, whereas, using DFT formation energies in a mean-field estimate gives $T_{melt}=\Delta H/\Delta S$ $E_{form}/S^c$~1500 K, which bracket [1500-1787 K] the observed begin and end melting (see below [1650-1780 K]).

Differential scanning calorimetry of the as-printed specimens was conducted to better understand the melting and solidification behavior. Results for the first heating cycle (using a rate of 20 K/minute) of the as-built specimen showed that multi-event melting begins and ends between 1650 and 1780 K, in agreement with the predicted values, with some evidence of thermally-driven microstructural evolution during the heating ramp.

Figure 3A:
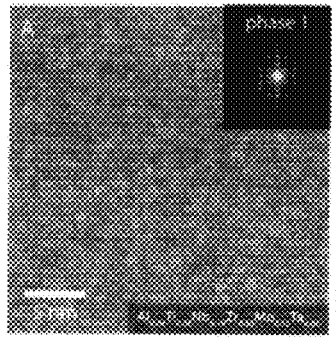
FIG. 3A-3F are atomic-resolution high-angle annular dark field (HAADF) images and Fast Fourier Transform (FFT) patterns of the images (insets) for (FIGS. 3A, 3C, 3D, 3F) the four distinct phases and (FIGS. 3B, 3E) two interphase boundaries showing high coherence.
Figure 3B:
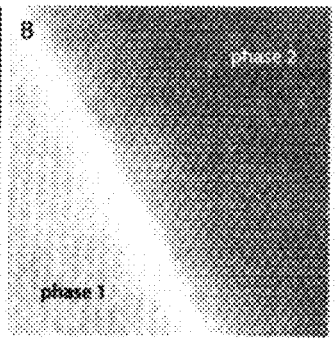
Figure 3C:
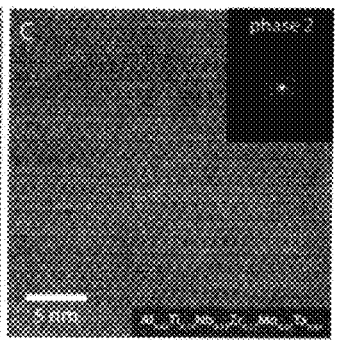
Figure 3D:
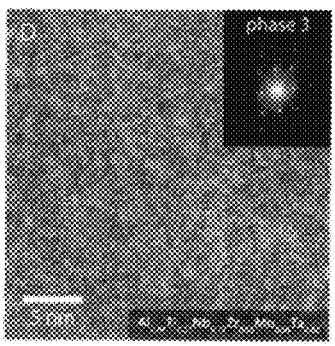
Figure 3E:
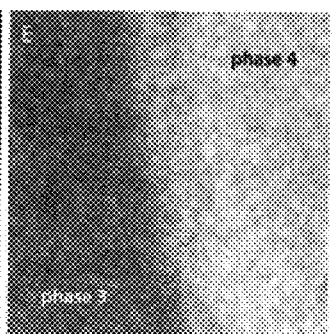
Figure 3F:
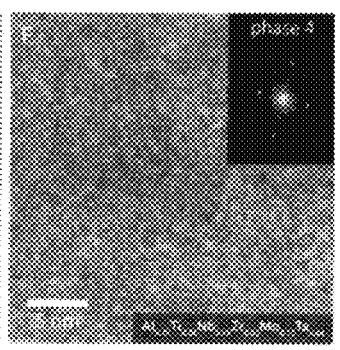
Figure 3G:
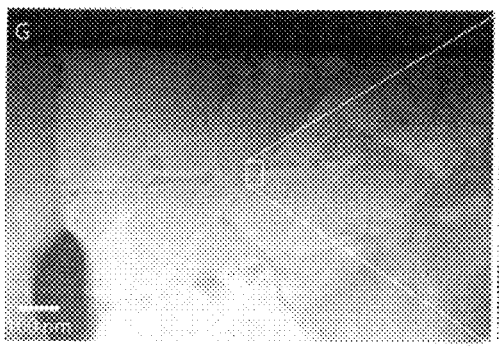
FIGS. 3G-3I are high-resolution images showing accommodation of plastic deformation in a 10 N micro-scratch track primarily by formation of dense dislocation walls; the scratch sliding direction is from left-to-right in FIG. 3G.
Figure 3H:
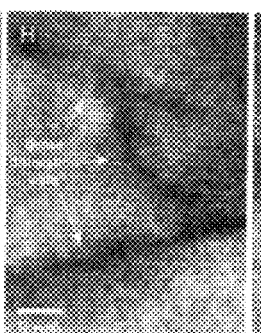
Figure 3I:
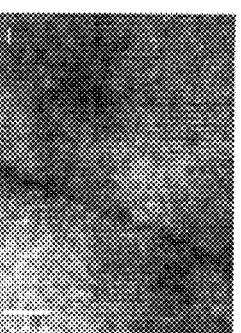

Extensive structural and compositional analysis by STEM are summarized in FIGS. 2A-2C and FIG. 4—Table 1, including subatomic resolution images of the multiple phases A1-A4 as well as a phase boundary (FIG. 3A-3F). This analysis showed that there was no mechanical mixing and negligible change in grain size inside the 10 N micro-scratch track at 1 s$^{-1}$ sliding speed, as compared to the adjacent, as-deposited material. These images, showing deformation near the surface along the track centerline (FIGS. 3G-3I), suggest that plastic deformation was primarily accommodated by intragranular deformation and the formation of dislocation walls (FIG. 3G-3I) that appear to fully transect grains. A possible explanation for the extraordinary strength and apparent ductility of this material may be in the activation of multiple dislocation types and slip systems, enabled by the higher lattice strains characteristic of multi-element solutions with high configurational entropy. The statement regarding ductility is based on qualitative observations of the micro-scratch tracks, which showed no evidence of cracking at track edges, as is expected for brittle materials. The defect structures shown in FIG. 3A-3I may promote non-screw dislocation nucleation and glide along multiple slip planes, presumably by increasing the activation energy barrier for screw dislocation motion. This may explain the unusually high strength of the $Al_{0.42}Ti_{0.25}Nb_{0.13}Zr_{0.08}Mo_{0.08}Ta_{0.04}$ alloy compared to peak tensile strengths of about 3 GPa in ultra-nanocrystalline BCC metals. Additionally, there is evidence that some interphase boundaries are substantially (highly) coherent, with misorientation of less than 2° between phases 1/2 and 3/4, as shown in FIGS. 3B and 3E, respectively. Highly coherent phase boundaries are another mechanism that may lead to the atypical combination of high strength and ductility, by acting as barriers to dislocation motion, thus promoting accumulation while mitigating crack formation.

The alloy polyphase microstructure imparts high strength and hardness to the as-deposited alloy with nearly temperature-independent strength up to 800° C., exceeding the performance of current state-of-the-art Ni-based superalloys. FIG. 5A presents results from high temperature nanoindentation on two AM builds with the same processing conditions, which showed different initial strengths but negligible change at temperatures up to 1073 K (800° C.). Ductile mechanical response was indeed observed during deep nanoindentation measurements (>1 μm depths) for all but the post –800° C. anneal room-temperature test condition (FIG. 5B). Reasons for the transition from ductile-to-brittle behavior following the 800° C. heat treatment remain unclear. Complementing the temperature-dependent thermomechanical property measurements, heat capacity and thermal conductivity over a temperature range of 25° C. (RT) to 300° C. were measured, in addition to the decoupled phonon subsystem contribution to thermal conductivity at room temperature (see Table I).

TABLE I

Summary of measured and calculated (DFT and virtual crystal approximation) properties for the multiphase AM $Al_{0.42}Ti_{0.25}Nb_{0.13}Zr_{0.08}Mo_{0.08}Ta_{0.04}$ alloy.

|  | Experimental | Calculated | % difference |  |
|---|---|---|---|---|
| hardness (STP), H | 10-15 | — | — | GPa |
| density (STP), ρ | 5.7 | 5.4 | 5.4 | g/cm3 |
| reduced modulus, $E_r$ | 219 | — | — | GPa |
| melting temperature, $T_m$ | 1650-1780 | 1500-1787 | 17.1 (max) | K |
| bulk modulus, B | — | 128 | — | GPa |
| fracture toughness, $K_c$ | 40-85 | — | — | GPa |
| Heat capacity, $\rho C_p$ | 1.9-2.5 | — | — | $MJ/m^3$-K |
| Thermal conductivity (total), k | 4-5.2 | — | — | W/m-K |
| Thermal conductivity @ 25° C. (phonon contribution), $k_l$ | 1.8 | 2.7-7.0 | 40-118 | W/m-K |

It is also possible to determine an estimate of ductility from the methods employed here; following work by D. A. Tabor, *A simple theory of static and dynamic hardness*, *Proceedings of the Royal Society of London, Series A*, Mathematical and Physical Sciences, 192, 247-274, 1948, which is incorporated herein to this end, for a spherical indenter of diameter (D), the plastic strain as a function of indentation area diameter or track width (d) can be approximated as $\varepsilon_p \approx 20d/D$, corresponding to a ductility of at least 5% at room temperature (RT) and as high as 10% at room temperature. This indicates that this alloy has practical engineering utility in structural applications and AM processes. Table 1 indicates that the alloy was found to have limited (low) thermal conductivity, which is typical for HEA compositions.

FIG. 5A presents results from high temperature nanoindentation testing of two AM built samples made using the same processing parameters. The samples exhibited different initial strengths but negligible change up to 1073 K (800° C.). Also, ductile mechanical response was indeed observed during deep nano-indentation measurements (greater than 1 μm depths) for all samples but the post-800° C. anneal RT test condition, FIG. 5B.

Figure 6A:
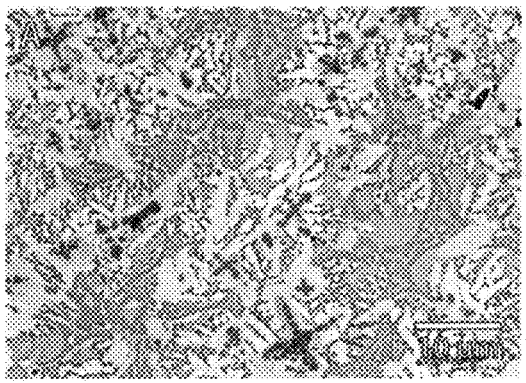
FIG. 6A and FIG. 6B are SEM images of the as-AM built microstructure at different magnifications.
Figure 6B:
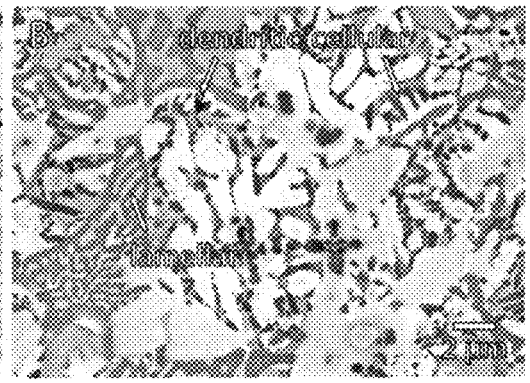
Figure 6C:
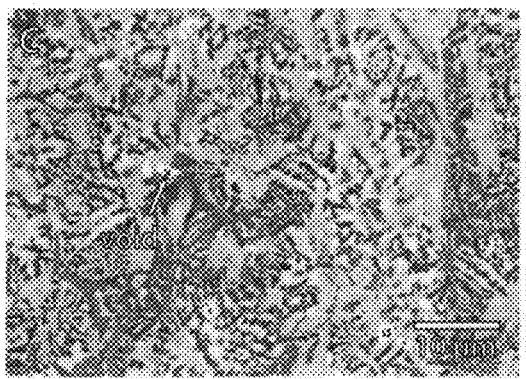
FIG. 6C and FIG. 6D are SEM images of the post heat treatment microstructure at different magnifications.
Figure 6D:
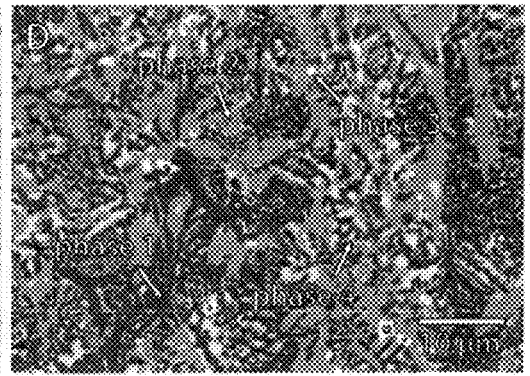

Further Microstructural and Compositional Characterizations:

The above discussed mechanical property data revealed several interesting features that are distinctly linked to the material polyphase microstructure. Specifically, gradual and spatially dependent trends of (1) increasing strength towards the core of the specimen normal to the build direction, (2) slightly decreasing strength along the build direction away from the specimen-baseplate interface, and (3) significant variability in strength (high standard deviation) with small changes in location. These trends suggest that the gradient in strength is correlated with build height, though this is likely the result of multiple factors that cannot easily be deconvoluted, such as variations in thermal history and accumulation of residual stresses. Furthermore, given the relatively coarse grain size of the as-built specimen, as shown via scanning electron microscopy (SEM) channeling contrast micrographs in FIG. 6A-6B, it is likely that the variability in nanoindentation hardness is indicative of strength differences between phases. Conversely, variability in micro-scratch hardness, which is averaged over comparatively larger volumes with a coarser (roughly 500 nm) lateral resolution, is more indicative of an aggregate response, and dominated by the weakest phase and the presence of defects on similar length scales. Representative SEM micrographs of the MPEA microstructure following high-temperature nanoindentation, which included exposure to 800° C. for 1 hour, are also provided in FIG. 6C-6D and show negligible change in terms of both feature morphology and size compared to as-AM built versions of the MPEA. These results suggest that the alloy exhibits thermal stability in environments that approach half the alloy melting temperature (homologous) and supports the observed persistence of high hardness both during and following high-temperature testing. While the present results are encouraging for retention of hardness at extraordinary temperatures, based on negligible microstructure evolution following high-temperature indentation, a 1-hour exposure at 800° C. is still a relatively modest exposure time for most applications that utilize conventional Ni based superalloys.

Figures 7A, 7B, 7C:
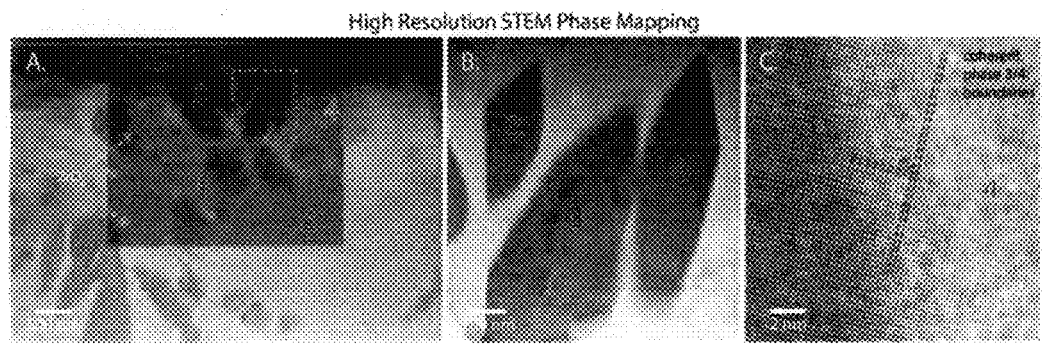
FIGS. 7A-7G: HAADF STEM images showing (FIGS. 7A-7B) grain and phase structure, (FIG. 7C) evidence of high coherence at phase 3/4 interfaces, and (FIGS. 7D-7E) lattice structures of phases 1 and 2 with overlaid elemental composition relative intensity maps, which indicate partial chemical ordering for phases 1 and 2, and (FIGS. 7F-7G) lattice structures of phases 3 and 4 along with inset FFT patterns. The lattice constant for phase 4, a BCC solid solution, matched the DFT predicted value.
Figures 7D, 7E, 7F, 7G:
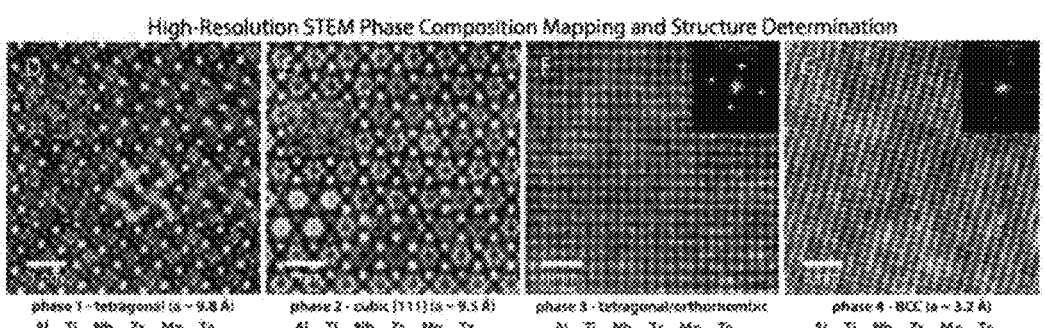

Referring to FIGS. 7A-7G, STEM (scanning transmission electron micrograph) characterization shows a partial analysis of the complex microstructure observed in an AM-processed RHEA (MPEA) sample, wherein four chemically and structurally unique phase are identified (Table II, FIG. 7A-7B). FIG. 7C shows evidence of high coherence at phase ¾ interfaces. Notably, all four phases have some extent of all six alloying constituents that compose the global MPEA composition, indicating a deviation from dilute alloying that is typical of conventional alloys. Two of the phases, phase 2 and 4 (FIGS. 7E and 7G) have a cubic symmetry with lattice parameters of 9.5 Å and 3.2 Å, respectively, illustrating vast differences in unit cell size. Phase 2 has a stoichiometry that is highly enriched in Al with notable fractions of Ti, Nb, and Zr constituents and relatively minor concentrations of Mo and Ta. Phase 4 is determined to be a body centered cubic (BCC) solid solution with a near-equiatomic ratio of Al and Ti and appreciable amounts of Mo and Nb and minor additions of Ta and Zr. The other two phases, that is phase 1 and phase 3, are both non-cubic and reveal a predominately tetragonal symmetry, and possible orthorhombic structure for phase 3. Both of these phases are enriched in Al compared to the other alloying constituents, with the former having appreciable Ti, Nb, and Mo content, while the latter shows higher concentrations of Ti and Nb, respectively. The lattice parameter for phase 1 is large, at 9.8 Å, similar to that for phase 2. Partial chemical ordering is also shown in the STEM images, aided by overlaid elemental maps for phase 1 and phase 2, that denote the fixed lattice positions for the alloying constituents. Thus, some of the phases are thought to, at minimum, show partial chemical ordering and are shown to drastically influence the alloy deformation behavior, FIG. 7D-7G. These structural and chemical data are complemented by differential scanning calorimetry (DSC) that enabled a baseline understanding of the melting and solidification behavior of the sample. Results for the first heating cycle (using a rate of 20 K/minute) of the as-built specimen indicate that multi-event melting begins and ends between 1650 and 1780 K (commensurate with rule-of-mixtures estimates), with some evidence of typical thermally-driven microstructural evolution during the heating ramp (e.g., dislocation recovery, grain growth, etc.). In addition, the microstructure revealed isolated evidence of spherical zirconium oxide dispersoids (FIG. 7A), likely driven, at least in part, by the high initial oxygen concentration (about 8.5 at. %) of the cryo-ball-milled powder. The volume fraction of detected oxide dispersoids is insufficient to account for the total measured oxygen content of the powder feedstock, suggesting that oxygen may be primarily in solution in the form of interstitial defects; it is known that group IV and V transition metals, including Ti, Zr, Nb and Ta, which are constituents of the present alloy, exhibit high oxygen solubility.

The structural and compositional analysis, by STEM, included atomic resolution images of the multiple phases as well as a phase boundary. As-built and post-deformation conditions, via scratch testing, were compared. This analysis showed negligible change in grain size inside the 10 N micro-scratch track, as compared to the adjacent as-deposited material. Deformation near the surface along the track centerline indicated that plastic deformation was confined to select phases, forming slip bands and dislocation walls that appear to fully transect grains but arrested by the dispersed and apparently softer phases 3 and 4 in FIG. 6A-6B.

As is apparent, embodiments of the present invention provide a multi-phase RHEA (MPEA) with high strength from a metastability in the complex energy-composition space that only occurs in a certain composition range. For an exemplar RHEA alloy in a specific composition range, multiple alloy phase compositions with common BCC phases compete via segregation to lower the average $E_{form}$, creating a steady-state multi-phase alloy with a large number of grain boundaries—with associated coherency strains. Furthermore, to have this thermodynamically favored, limits for the parent phase (here Al/Ti and refractory elements) to affect BCC stability and its relative stability versus FCC and HCP were established. In particular, the parent nominal alloy (in atomic %) has a % Al ranging from about 20 to less than about 70%, as determined from the binary Al—Ti system, has the combined % (Al+Ti) ranging from over about 55 to less than about 75%, and have the refractory elements as shown, where % Mo≥% Nb−% Ta and % Zr is large enough to drive segregation, in this case about 8% Zr.

Towards AM-Friendly Improved MPEAs and Energy-Efficient Manufacturing

Conventional alloys explored by others to date for use with AM generally possess hardness values ranging from 1-10 GPa, and corresponding estimated yield strength values from 0.2 to 1 GPa, which is notably lower than those of the present exemplar alloy for both properties, in some cases by an order-of-magnitude. Similarly beneficial results were noted in the context of AM processing efficiency. Notably, mechanically pre-mixed, compositionally segregated and high-impurity content cryo-ball milled powder was utilized as feedstock, wherein large negative heats of mixing and very significant in situ exothermic reactions assisted with particulate melting and molten alloy homogenization in the melt pool during processing. This, in combination with the reduced alloy melting temperature, led to a low beam power (100-110 W) and, consequentially, a very low volumetric energy density (VED) of 40-50 J/mm$^3$ for the laser-based directed-energy deposition AM technique to sufficiently heat and melt the heterogeneous powder. Most conventional alloys, evaluated with laser-based additive methods, require significantly higher VED values to achieve high-quality metallurgical specimens, particularly for HEAs/MPEAs and refractory-based alloys, where VED values range from approximately 20 to 2000 J/mm$^3$. Overall, the combination of high material hardness and estimated yield strength (10-15 GPa and 3-5 GPa, respectively) and energy-efficient processing (VED=40-50 J/mm$^3$) for the $Al_{0.42}Ti_{0.25}Nb_{0.13}Zr_{0.08}Mo_{0.08}Ta_{0.04}$ alloy represents a paradigm shift compared to the current state-of-art. This suggests a route for careful feedstock design (perhaps with blended master alloy powders in a uniform bed or in a powder feeder) to enable energy-efficient AM processing of alloys, particularly those with compositions that would be impractical to create using conventional ingot metallurgy practices (e.g., casting of the full alloy to use in gas atomization processing). This is particularly true for refractory metal MPEAs with high concentrations of elements having dissimilar melting temperatures, such as in this case, with extremes of 933 K (Al) and 3290 K (Ta) for the lowest and highest constituent melting temperatures, respectively.

To test the ability to reach these outstanding strength and hardness values in this exemplar MPEA with a powder feedstock that can be made by more conventional (for Ti alloys) powder making methods (plasma melting in a cold hearth and free-fall gas atomization), inert gas atomized powder having the exemplar alloy composition set forth above (in atomic %) and an average powder particle size (diameter) of 45 microns was obtained and used as the feedstock powder for the LENS-AM (laser engineered net shaping-AM) system at Sandia National Laboratories to produce an AM layer (about 6 mm thick) structure. The AM deposit exhibited a Vickers hardness of 779, which is about 7.6 GPa. A high hardness that is similar to the hardness values discussed above in the AM example made from cryo-milled heterogeneous powder.

Sintering Example:

To test the ability to reach these outstanding strength and hardness values in this exemplar MPEA with a more conventional (not for forming complex shapes) full-density powder consolidation method, a sample of the same pre-alloyed gas atomized powder having the exemplar alloy composition set forth above (in atomic %) and an average powder particle size (diameter) of 45 microns was spark plasma sintered at a target temperatures of 1100, 1200 (two samples), and 1250 degrees C. at a rate of 100 degrees C./minute and 50 MPa pressure for to form a disc shape having densities of 5.43; 5.39 and 5.49 (repeat sample); and 5.46 g/cm$^3$, respectively. The 1200 degree C. sintered samples exhibited Vickers hardness values of 853.2; 850.05; and 837.32 at different indenter loads of 200 grams; 500 grams; and 1 kilogram, which is about a hardness of 8.2

GPa. Again, this high hardness is similar to the hardness values discussed above in the AM example made from cryo-milled heterogeneous powder.

The alloy of the evaluated illustrative embodiments is in a unique region of composition space, being significantly enriched in Al and Ti compared to a majority of other RHEA studies. These are ideal constituents to enable light-weighting of structural parts. Compositionally, the present alloy should be significantly less dense than known refractory-rich HEAs, while also retaining higher strength and more refined microstructure associated with the rapid solidification characteristics of AM. This highlights the value proposition of combining advanced alloys with advanced manufacturing methods to achieve unprecedented materials properties. This Al-RHEA has noticeable similarities with respect to strength-to-weight (normalized) properties with classical Ti—Al intermetallic alloys that have been revered for potential use in structural aerospace applications, due to their high specific strength. Since poor Ti—Al alloy workability has long challenged their widespread adoption. Given that these newly discovered RHEA embodiments are processable via near-net shape additive manufacturing methods and full density sintering methods, and that they have unusually high strength in an as-built or as-sintered form (far exceeding polycrystalline alloys), multiple opportunities lie ahead to accelerate the development of next-generation lightweight structural aerospace alloys. Optimized processing conditions for enhanced strength or improved ductility can be conducted to establish a viable pathway for scaling-up part geometries with minimal defects. The above Examples demonstrate the extraordinary mechanical property results that can be achieved by combining unconventional processing techniques (AM) or more conventional sintering techniques (e.g., spark plasma sintering) and novel materials (non-equiatomic, multi-phase RHEAs). This would enable more direct comparisons of strength and toughness at similar part geometry length scales.

Although the present invention has been described with respect to certain illustrative embodiments, those skilled in the art will appreciate that modifications and changes can be made therein without departing from the spirit and scope of the invention.

REFERENCES WHICH ARE INCORPORATED HEREIN BY REFERENCE

1. Peng, T., Kellens, K., Tang, R., Chen, C. & Chen, G. Sustainability of additive manufacturing: An overview on its energy demand and environmental impact. *Addit. Manuf* 21, 694-704 (2018).
2. Lewandowski, J. J. & Seifi, M. Metal Additive Manufacturing: A Review of Mechanical Properties. *Annu. Rev. Mater. Res.* 46, 151-186 (2016).
3. Bajaj, P. et al. Steels in additive manufacturing: A review of their microstructure and properties. *Mater. Sci. Eng. A* 772, (2020).
4. George, E. P., Raabe, D. & Ritchie, R. O. High-entropy alloys. *Nat. Rev. Mater.* 4, 515-534 (2019).
5. Martin, J. H. et al. 3D printing of high-strength aluminium alloys. *Nature* 549, 365-369 (2017).
6. Hu, X. et al. Towards an integrated experimental and computational framework for large-scale metal additive manufacturing. *Mater. Sci. Eng. A* 761, 138057 (2019).
7. Melia, M. A. et al. High-throughput additive manufacturing and characterization of refractory high entropy alloys. *Appl. Mater. Today* 19, 100560 (2020).
8. Pegues, J. W. et al. Exploring additive manufacturing as a high-throughput screening tool for multiphase high entropy alloys. *Addit. Manuf* 101598 (2020) doi:10.1016/j.addma.2020.101598.
9. Kustas, A. B. et al. Characterization of the Fe—Co-1.5V soft ferromagnetic alloy processed by Laser Engineered Net Shaping (LENS). *Addit. Manuf.* 21, 41-52 (2018).
10. Senkov, O. N., Miracle, D. B., Chaput, K. J. & Couzinie, J. P. Development and exploration of refractory high entropy alloys—A review. *J. Mater. Res.* 33, 3092-3128 (2018).
11. Miracle, D. B. & Senkov, O. N. A critical review of high entropy alloys and related concepts. *Acta Mater.* 122, 448-511 (2017).
12. Heiden, M. J. et al. Evolution of 316L stainless steel feedstock due to laser powder bed fusion process. *Addit. Manuf.* 25, 84-103 (2019).
13. Akono, A. T., Randall, N. X. & Ulm, F. J. Experimental determination of the fracture toughness via microscratch tests: Application to polymers, ceramics, and metals. *J. Mater. Res.* 27, 485-493 (2012).
14. Gludovatz, B. et al. A fracture-resistant high-entropy alloy for cryogenic applications. *Science* (80-). 345, 1153-1158 (2014).
15. Zhu, Z. G. et al. Selective laser melting enabling the hierarchically heterogeneous microstructure and excellent mechanical properties in an interstitial solute strengthened high entropy alloy. *Mater. Res. Lett.* 7, 453-459 (2019).
16. Guan, S. et al. Additive manufacturing of fine-grained and dislocation-populated CrMnFeCoNi high entropy alloy by laser engineered net shaping. *Mater. Sci. Eng. A* 761, 138056 (2019).
17. Li, R. et al. Selective laser melting of an equiatomic CoCrFeMnNi high-entropy alloy: Processability, non-equilibrium microstructure and mechanical property. *J. Alloys Compd.* 746, 125-134 (2018).
18. Zhu, Z. G. et al. Hierarchical microstructure and strengthening mechanisms of a CoCrFeNiMn high entropy alloy additively manufactured by selective laser melting. *Scr. Mater.* 154, 20-24 (2018).
19. Zhang, M. et al. AlCoCuFeNi high-entropy alloy with tailored microstructure and outstanding compressive properties fabricated via selective laser melting with heat treatment. *Mater. Sci. Eng. A* 743, 773-784 (2019).
20. Chew, Y. et al. Microstructure and enhanced strength of laser aided additive manufactured CoCrFeNiMn high entropy alloy. *Mater. Sci. Eng. A* 744, 137-144 (2019).
21. Agrawal, P. et al. Excellent strength-ductility synergy in metastable high entropy alloy by laser powder bed additive manufacturing. *Addit. Manuf.* 32, 101098 (2020).
22. Nartu, M. S. K. K. Y. et al. Enhanced tensile yield strength in laser additively manufactured Al0.3 CoCrFeNi high entropy alloy. *Materialia* 9, 100522 (2020).
23. Li, Q. et al. W x NbMoTa refractory high-entropy alloys fabricated by laser cladding deposition. *Materials* (Basel). 12, 1-14 (2019).
24. Peyrouzet, F. et al. Selective Laser Melting of Al0.3CoCrFeNi High-Entropy Alloy: Printability, Microstructure, and Mechanical Properties. *JOM* 71, 3443-3451 (2019).
25. Read, N., Wang, W., Essa, K. & Attallah, M. M. Selective laser melting of AlSi10Mg alloy: Process optimisation and mechanical properties development. *Mater. Des.* 65, 417-424 (2015).
26. Uzan, N. E., Shneck, R., Yeheskel, O. & Frage, N. Fatigue of AlSi10Mg specimens fabricated by additive 27. Tong, Z. et al. Laser additive manufacturing of FeCr-CoMnNi high-entropy alloy: Effect of heat treatment on microstructure, residual stress and mechanical property. *J. Alloys Compd.* 785, 1144-1159 (2019).
28. Hitzler, L. et al. Direction and location dependency of selective laser melted AlSi10Mg specimens. *J. Mater. Process. Technol.* 243, 48-61 (2017).
29. Pegues, J., Roach, M., Scott Williamson, R. & Shamsaei, N. Effect of specimen surface area size on fatigue strength of additively manufactured Ti-6Al-4V parts. *Solid Free. Fabr.* 2017 *Proc. 28th Annu. Int. Solid Free. Fabr. Symp.-An Addit. Manuf Conf SFF* 2017 122-133 (2020).
30. Carroll, B. E., Palmer, T. A. & Beese, A. M. Anisotropic tensile behavior of Ti-6Al-4V components fabricated with directed energy deposition additive manufacturing. *Acta Mater.* 87, 309-320 (2015).
31. Vrancken, B., Thijs, L., Kruth, J. P. & Van Humbeeck, J. Heat treatment of Ti6 Å14V produced by Selective Laser Melting: Microstructure and mechanical properties. *J. Alloys Compd.* 541, 177-185 (2012).
32. Ben, V. & Jean-Pierre, K. Selective laser melting of biocompatible metals for rapid manufacturing of medical parts. *Rapid Prototyp. J.* 13, 196-203 (2007).
33. Kim, Y. K., Choe, J. & Lee, K. A. Selective laser melted equiatomic CoCrFeMnNi high-entropy alloy: Microstructure, anisotropic mechanical response, and multiple strengthening mechanism. *J. Alloys Compd.* 805, 680-691 (2019).
34. Zhou, R. et al. Microstructures and mechanical properties of C-containing FeCoCrNi high-entropy alloy fabricated by selective laser melting. *Intermetallics* 94, 165-171 (2018).
35. Wu, W. et al. Nanosized precipitates and dislocation networks reinforced C-containing CoCrFeNi high-entropy alloy fabricated by selective laser melting. *Mater. Charact.* 144, 605-610 (2018).
36. Brif, Y., Thomas, M. & Todd, I. The use of high-entropy alloys in additive manufacturing. *Scr. Mater.* 99, 93-96 (2015).
37. Joseph, J. et al. Effect of hot isostatic pressing on the microstructure and mechanical properties of additive manufactured AlxCoCrFeNi high entropy alloys. *Mater. Sci. Eng. A* 733, 59-70 (2018).
38. Zhou, P. F., Xiao, D. H., Wu, Z. & Ou, X. Q. A10.5FeCoCrNi high entropy alloy prepared by selective laser melting with gas-atomized pre-alloy powders. *Mater. Sci. Eng. A* 739, 86-89 (2019).
39. Luo, S., Zhao, C., Su, Y., Liu, Q. & Wang, Z. Selective laser melting of dual phase AlCrCuFeNix high entropy alloys: Formability, heterogeneous microstructures and deformation mechanisms. *Addit. Manuf.* 31, 100925 (2020).
40. Oliver, W. C. & Pharr, G. M. Measurement of hardness and elastic modulus by instrumented indentation: Advances in understanding and refinements to methodology. *J. Mater. Res.* 19, 3-20 (2004).
41. Nyakiti, L. O. & Jankowski, A. F. Characterization of strain-rate sensitivity and grain boundary structure in nanocrystalline gold-copper alloys. *Metall. Mater. Trans. A Phys. Metall. Mater. Sci.* 41, 838-847 (2010).
42. Nix, W. D. & Gao, H. Indentation size effects in crystalline materials: A law for strain gradient plasticity. *J. Mech. Phys. Solids* 46, 411-425 (1998).
43. Gu, C. D., Lian, J. S., Jiang, Q. & Zheng, W. T. Experimental and modelling investigations on strain rate sensitivity of an electrodeposited 20 nm grain sized Ni. *J. Phys. D. Appl. Phys.* 40, 7440-7446 (2007).
44. Wang, F. et al. Multiplicity of dislocation pathways in a refractory multiprincipal element alloy. *Science* 370, 95-101 (2020).
45. Singh, P., Smirnov, A. V., Alam, A. & Johnson, D. D. First-principles prediction of incipient order in arbitrary high-entropy alloys: exemplified in TiO.25CrFeNiAlx. *Acta Mater.* 189, 248-254 (2020).
46. Singh, P., Smirnov, A. V. & Johnson, D. D. Atomic short-range order and incipient long-range order in high-entropy alloys. *Phys. Rev. B—Condens. Matter Mater. Phys.* 91, 1-12 (2015).
47. Singh, P. et al. Design of high-strength refractory complex solid-solution alloys. *npj Comput. Mater.* 4, (2018).
48. Singh, P. et al. Vacancy-mediated complex phase selection in high entropy alloys. *Acta Mater.* 194, 540-546 (2020).
49. Tran, A., Tranchida, J., Wildey, T. & Thompson, A. P. Multi-fidelity machine-learning with uncertainty quantification and Bayesian optimization for materials design: Application to ternary random alloys. *J. Chem. Phys.* 153, 1-9 (2020).
50. Chen, B. et al. Unusual activated processes controlling dislocation motion in body-centered-cubic high-entropy alloys. *Proc. Natl. Acad. Sci. U.S.A* 117, 16199-161206 (2020).
51. Cordero, Z. C., Knight, B. E. & Schuh, C. A. Six decades of the Hall-Petch effect—a survey of grain-size strengthening studies on pure metals. Int. Mater. Rev. 61, 495-512 (2016).
52. Lu, K., Lu, L. & Suresh, S. Strengthening materials by engineering coherent internal boundaries at the nanoscale. *Science* (80-). 324, 349-352 (2009).
53. Senkov, O. N., Senkova, S. V. & Woodward, C. Effect of aluminum on the microstructure and properties of two refractory high-entropy alloys. *Acta Mater.* 68, 214-228 (2014).
54. Chen, W. & Li, Z. 11—Additive manufacturing of titanium aluminides. in *Additive Manufacturing for the Aerospace Industry* (eds. Froes, F. & Boyer, R. B. T.-A. M. for the A. I.) 235-263 (Elsevier, 2019). doi:https://doi.org/10.1016/B978-O-12-814062-8.00013-3.
55. Dilip, J. J. S., Miyanaji, H., Lassell, A., Starr, T. L. & Stucker, B. A novel method to fabricate TiAl intermetallic alloy 3D parts using additive manufacturing. *Def Technol.* 13, 72-76 (2017).

We claim:

1. An alloy having Al and Ti as major alloy constituents and Nb, Zr, Mo, and Ta as minor alloy constituents whose minor collective content is effective to provide a polyphase microstructure including at least four compositionally distinct intermetallic phases.

2. The alloy of claim 1 having Al+Ti content that is greater than 50 atomic %.

3. The alloy of claim 1 having substantially coherent interphase boundaries having a misorientation less than 2° between boundary phases.

4. A structure comprising the alloy of claim 1 that is at least one of an as-built AM structure, a sintered structure, and a solidified structure.

5. A 3D structure comprising the alloy of claim 1.

6. A method comprising building a 3D structure that comprises the alloy of claim 1 by additive manufacturing.

7. A method comprising building a sintered structure that comprises the alloy of claim 1 by sintering powders of the alloy.

8. An alloy having a composition represented by $Al_{0.42}Ti_{0.25}Nb_{0.13}Zr_{0.08}Mo_{0.08}Ta_{0.04}$ that has a polyphase microstructure including at least four (4) compositionally distinct intermetallic phases or variants of the composition wherein content of at least one of Al, Ti, Nb, Zr, Mo, and Ta is so varied that the alloy has Al+Ti content greater than 50 atomic % and that the alloy has a polyphase microstructure including four (4) compositionally distinct intermetallic phases and exhibits a mechanical strength that is independent of temperature up to 800° C.

9. An alloy having a composition represented by $Al_{0.42}Ti_{0.25}Nb_{0.13}Zr_{0.08}Mo_{0.08}Ta_{0.04}$ that has a polyphase microstructure including at least four (4) compositionally distinct intermetallic phases or variants of the composition wherein content of at least one of Al, Ti, Nb, Zr, Mo, and Ta is so varied that Al+Ti content is greater than 50 atomic % and that the alloy has a polyphase microstructure including at least four (4) compositionally distinct intermetallic phases.

10. The alloy of claim 9 having substantially coherent interphase boundaries having a misorientation of less than 2° between boundary phases.

11. The alloy of claim 9 that exhibits a specific strength equal to hardness:density ratio at room temperature of 1.8 to 2.6 GPa-cm³/g.

12. A structure comprising the alloy of claim 9.

13. The structure of claim 12 that is at least one of an as-built AM structure, a sintered structure, and a solidified structure.

14. A deposited layer comprising the alloy of claim 9.

15. An alloy having an Al content greater than 20 atomic % to less than about 70 atomic %, an Al+Ti content greater than 55 atomic % and less than about 75 atomic %, and a collective content of Nb, Zr, Mo, and Ta of about 25 atomic % to about 45 atomic % wherein the alloy has a polyphase microstructure including at least four compositionally distinct intermetallic phases.

16. The alloy of claim 15 having Al content from 20 to 70 atomic %, and an Al+Ti content from 65 to less than 75 atomic %.

17. The alloy of claim 15 having substantially coherent interphase boundaries having a misorientation less than 2° between boundary phases.

18. The alloy of claim 15 that exhibits a mechanical strength or hardness that is independent of temperature up to 800° C.

19. The alloy of claim 15 that exhibits a specific strength equal to hardness:density ratio at room temperature of 1.8 to 2.6 GPa-cm³/g.

20. A deposited layer comprising the alloy of claim 15.

* * * * *